(12) United States Patent
Zhao et al.

(10) Patent No.: US 11,970,564 B2
(45) Date of Patent: Apr. 30, 2024

(54) STRUCTURAL FLAME RETARDANT HIGH STRENGTH LOW EXOTHERMIC POLYMER GROUTING MATERIAL FOR CONSOLIDATING

(71) Applicants: SAFEKEY Engineering Technology (Zhengzhou), Ltd., Henan (CN); Huizhou Mingsheng Chemical Materials Co., LTD., Guangdong (CN); WELEAD Infrastructure Engineering Technology (Zhengzhou), Ltd., Henan (CN)

(72) Inventors: Peng Zhao, Henan (CN); Hongyuan Fang, Henan (CN); Lei Wang, Guangdong (CN); Chengchao Guo, Henan (CN); Mingrui Du, Guangdong (CN); Chao Zhang, Guangdong (CN); Guobin Qiao, Henan (CN)

(73) Assignees: SAFEKEY Engineering Technology (Zhengzhou), Ltd., Henan (CN); Huizhou Mingsheng Chemical Materials Co., LTD., Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 17/949,014

(22) Filed: Sep. 20, 2022

(65) Prior Publication Data

US 2023/0041379 A1 Feb. 9, 2023

(30) Foreign Application Priority Data

Jan. 28, 2022 (CN) .......................... 202210108751.X

(51) Int. Cl.

| | |
|---|---|
| *C08G 18/76* | (2006.01) |
| *C08G 18/12* | (2006.01) |
| *C08G 18/20* | (2006.01) |
| *C08G 18/32* | (2006.01) |
| *C08G 18/48* | (2006.01) |
| *C08G 18/50* | (2006.01) |
| *C08G 18/61* | (2006.01) |
| *C08G 18/64* | (2006.01) |
| *C08G 18/67* | (2006.01) |
| *C08G 18/77* | (2006.01) |
| *C08L 75/08* | (2006.01) |

(52) U.S. Cl.
CPC ......... *C08G 18/12* (2013.01); *C08G 18/2027* (2013.01); *C08G 18/3243* (2013.01); *C08G 18/4845* (2013.01); *C08G 18/5075* (2013.01); *C08G 18/61* (2013.01); *C08G 18/6461* (2013.01); *C08G 18/6785* (2013.01); *C08G 18/7621* (2013.01); *C08G 18/776* (2013.01); *C08L 75/08* (2013.01); *C08L 2201/02* (2013.01)

(58) Field of Classification Search
CPC ............ C08G 18/5075; C08G 18/6461; C08G 18/6785; C08G 18/7621
See application file for complete search history.

(56) References Cited

U.S. PATENT DOCUMENTS

| | | | | |
|---|---|---|---|---|
| 3,846,347 | A * | 11/1974 | Satterly ............. | C08G 18/4829 521/159 |
| 2007/0276055 | A1 * | 11/2007 | Sjerps ................ | C08G 18/7664 521/88 |
| 2012/0142801 | A1 * | 6/2012 | Prissok ............. | C08G 18/7664 521/170 |
| 2013/0158142 | A1 * | 6/2013 | Adkins .............. | C08G 18/7621 521/137 |

FOREIGN PATENT DOCUMENTS

| | | | | |
|---|---|---|---|---|
| CN | 106279610 A | * | 1/2017 | ......... C08G 18/4829 |
| WO | WO-2013135746 A1 | * | 9/2013 | ........... C08G 18/092 |

OTHER PUBLICATIONS

CN-106279610_01-2017_English Translation.*

* cited by examiner

*Primary Examiner* — Michael L Leonard

(57) ABSTRACT

A structural flame retardant high strength low exothermic polymer grouting material for consolidating, belonging to a technical field of polyurethane material, is produced by combined the polyether polyol and the modified isocyanate in a weight ratio of 100:(100-160), leading to internal reaction temperature ≤100° C., strength ≥60 mPa, bonding ≥3 mPa, oxygen index ≥28% while no halogen and no effect on water quality, odor level (80° C.) ≤3.5, and fog test ≤5 mg (which means no physical additive flame retardant is diffused into the environment). In particular, with no halogen, which is known as environmental hormones, in the plasticizers, there will be less combustion smoke, wherein the present invention will not release corrosive or irritating hydrogen halide gas, nor produce toxic carcinogens polybrominated benzoxins and polybrominated dibenzofurans, thereby avoiding the long-term impact of the material on the environment.

5 Claims, No Drawings

STRUCTURAL FLAME RETARDANT HIGH STRENGTH LOW EXOTHERMIC POLYMER GROUTING MATERIAL FOR CONSOLIDATING

CROSS REFERENCE OF RELATED APPLICATION

The present invention claims priority under 35 U.S.C. 119(a-d) to CN 202210108751.X, filed Jan. 28, 2022.

BACKGROUND OF THE PRESENT INVENTION

Field of Invention

The present invention relates to a structural flame retardant high strength low exothermic polymer grouting material for consolidating, belonging to a technical field of polyurethane material.

Description of Related Arts

During the excavation process of coal mine tunnels, broken or loose coal rock mass often leads to accidents such as roof fall, siding and landslides, which not only seriously endanger the workers, but also seriously affect the production efficiency of enterprises. On the other hand, highways and other infrastructures have now shifted from large-scale construction to large-scale maintenance, and water stabilization layer has suffered more and more fracture, fragmentation and water damage. Since the highways should be kept open, it is unrealistic to perform large-scale excavation. As a result, it is generally necessary to perform grouting consolidating on the broken coal rock mass or the broken water stabilization layer, no matter it is in the excavation process of coal mine tunnels or in the road maintenance. There are many types of grouting materials, generally divided into inorganic grouting ones and organic grouting ones. Inorganic materials are widely used in sodium silicate-cement double liquid grouting, the advantages of which are low cost and basically no exothermic reaction. However, the curing speed is slow, compressive strength and bonding strength low, permeability and toughness are poor. Organic grouting materials include acrylamide chemical grouting materials, epoxy resin chemical grouting materials, methyl methacrylate chemical grouting materials, urea-formaldehyde resin chemical grouting materials and polyurethane chemical grouting materials. Among them, polyurethane grouting material has become the optimized choice for water blocking consolidating and loose part cementation in engineering due to moderate viscosity, adjustable curing time, fast reaction speed, good mechanical properties, convenient construction and many other advantages, and has been widely used in underground engineering such as coal mine and road engineering.

AQ/T 1089-2020 *Polymer Materials for Consolidating Coal and Rock at Coal Mine* stipulates that the oxygen index of polyurethane material is greater than or equal to 28%, and the flame burning time of alcohol torch combustion test is ≤3 s. Polyurethane and other polymer materials are not flame retardant themselves. Without adding flame retardants, the oxygen index is about 17%, which cannot meet the flame retardant requirements of coal mines. The flame retardant properties of polymer materials can be improved by adding physical flame retardants such as tris (chloroethyl) phosphate (TCEP) and tris (1-chloro-2-propyl) phosphate (TCPP), which is convenient and cheap, but has the following four problems:

1. Most of the additive physical flame retardants contain halogen elements such as chlorine and bromine. However, halogen flame retardants may contaminate coal, produce acid gas when burning and cause air pollution, or poison heavy metal catalysts when used as chemical coal, seriously affecting industrial production.

2. The molecular weight of the additive physical flame retardant used in polyurethane rigid foam is small, so the retardant will migrate to the surface of the polymer material over time, reducing the flame retardancy of the polymer material and affecting the soil and groundwater sources.

3. The additive physical flame retardant does not participate in the structure of the polymer material, which will lower the physical properties such as the strength of the polymer material.

If the polyurethane grouting material contains halogen elements, there will also be some problems in practical application. For example, the chemical coal produced by coal mines requires low chlorine content or no chlorine content, and the lump coal used by Shanxi Coal Group for producing chemical fertilizers requires a chlorine content of less than 5/10,000 to prevent the halogen elements in the grouting materials from poisoning the heavy metal catalysts. In some concrete grouting consolidating projects, the migration of halogen-based flame retardants in the grouting material may cause a loose base layer and poor surface appearance quality.

Environmental issues such as TVOC and odor are another bottleneck for polyurethane flame retardant materials in enclosed spaces. Flame retardant and environmental protection are mutually opposing indicators, and flame retardants are the main source of TVOC and odor.

In addition, compared with AQ/T 1089-2011, AQ/T 1089-2020 *Polymer Materials for Consolidating Coal and Rock at Coal Mine* requires the internal reaction temperature to be reduced from ≤140° C. to ≤100° C. during curing, which inevitably reduces the compressive strength from ≥60 mPa to ≥40 mPa. At the meantime, some coal mine bidding documents still require the compressive strength to be ≥60 mPa when the internal reaction temperature is required to be ≤100° C. There is a lack of materials on the market that meet the requirements of the bidding documents.

SUMMARY OF THE PRESENT INVENTION

An object of the present invention is to solve the above-mentioned deficiencies in the prior art, which starts with modified flame retardant isocyanate compound to avoid lowering environmental protection indexes of polyurethane materials by physical flame retardants. With the modified isocyanate of the present invention, few or no flame retardant is added into a polyol component, thereby simultaneously improving flame retardancy of the polyurethane materials and avoiding lowering the environmental protection indexes by the flame retardants. The conflict of high flame retardancy and environmental protection indexes such as low TVOC and low odor is resolved.

Accordingly, in order to accomplish the above object, the present invention provides a structural flame retardant high strength low exothermic polymer grouting material for consolidating, consisting of: a modified isocyanate component and a polyol component which are polymerized together, wherein a mass ratio of the modified isocyanate component to the polyol component is (100-160):100; a structural formula of the modified isocyanate component is:

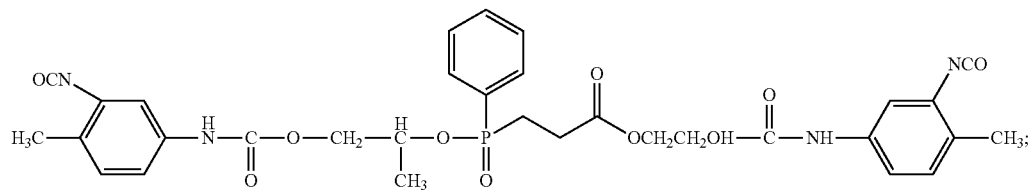

the modified isocyanate component has a P content of 4.4%, an N content of 7.9%, and an NCO % content of 11.9%;

the polyol component comprises: polyether polyol which adopts 6-functionality sorbitol as an initiator, 4,4'-bis-sec-butylaminodiphenylmethane, silicone oil, and a reactive catalyst, wherein the polyether polyol which adopts the 6-functionality sorbitol as the initiator accounts for 50-70% of a total weight of the polyol component; 4,4'-bis-sec-butylaminodiphenylmethane accounts for 25-45% of the total weight of the polyol component; the silicone oil, i.e. a surfactant, accounts for 1-3% of the total weight of the polyol component; and the reactive catalyst accounts for 2-4% of the total weight of the polyol component.

The polyether polyol which adopts the 6-functionality sorbitol as the initiator is a highly active polyether with the sorbitol as the initiator and propylene oxide as a polymerized monomer.

The polyether polyol which adopts the 6-functionality sorbitol as the initiator adopts YD6482 from Hebei Yadong Chemical Group Co., Ltd. or NJ-6207 from Jurong Ningwu New Material Development Co., Ltd.

The 4,4'-bis-sec-butylaminodiphenylmethane is a liquid sec-diamine.

The surfactant is the silicone oil. The silicone oil is polydimethylsiloxane, which adopts L6950 from Momentive High-tech Materials Group.

The reactive catalyst mainly adopts Dabco T from Evonik Specialty Chemicals (Shanghai) Co., Ltd.

The present invention also provides a method for synthesizing the structural flame retardant high strength low exothermic polymer grouting material for consolidating, comprising a step of polymerizing a modified isocyanate component with a polyol component, wherein a method for synthesizing the modified isocyanate component comprises steps of:

1) esterifying 2-carboxyethyl phenyl hypophosphorous acid and ethylene glycol with a molar ratio of 1:1, so as to obtain 2-carboxyethyl phenyl hypophosphite ethylene glycol, wherein a reaction equation is:

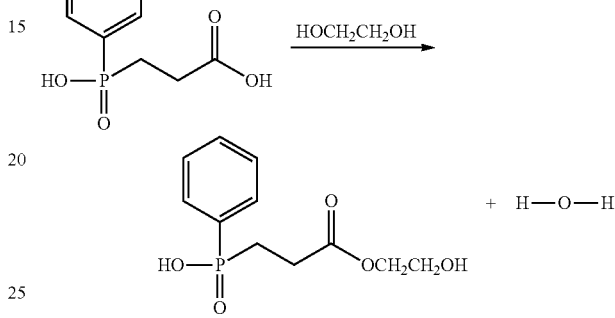

2) performing an addition reaction to the 2-carboxyethyl phenyl hypophosphite ethylene glycol and propylene oxide with a molar ratio of 1:1, so as to generate a phosphorus-containing diol intermediate, wherein a reaction equation is:

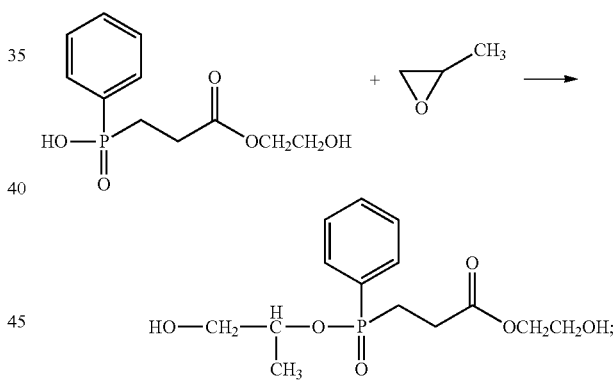

and 3) polymerizing the phosphorus-containing diol intermediate and TDI to obtain a difunctional modified flame retardant isocyanate compound, wherein a reaction equation is:

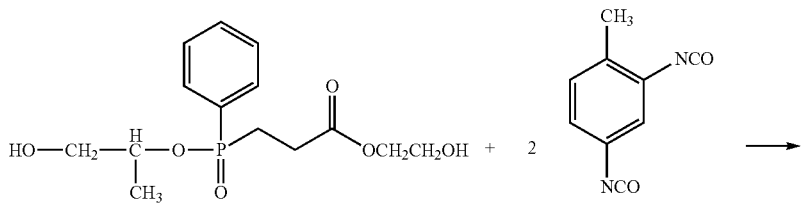

-continued

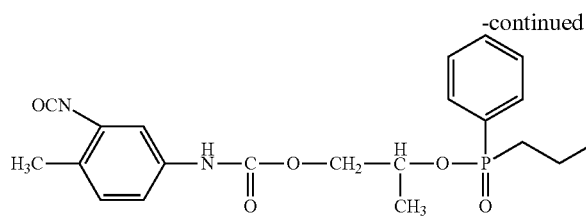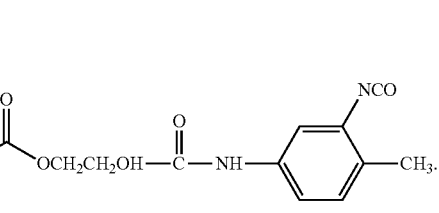

Specific synthesis process of the modified isocyanate comprises steps of:

1) putting 2-carboxyethylphenyl hypophosphorous acid (Wuhan Hezhong Biochemical Manufacturing Co., Ltd.) and ethylene glycol into a reaction kettle at a molar ratio of 1:1, and then esterifying at 105-110° C. under catalysis of sulfuric acid or organotin to generate the 2-carboxyethyl phenyl hypophosphite ethylene glycol, wherein resulting water is distilled off from a top of the reaction kettle;

2) heating the 2-carboxyethyl phenyl hypophosphite ethylene glycol to between 100-110° C. in reaction kettle, using potassium hydroxide a catalyst, and slowly adding propylene oxide at a molar ratio of 1:1; gradually raising a reaction pressure in the reaction kettle and keeping a maximum pressure below 2.5 kg; keeping a temperature in the reaction kettle between 100-115° C., and maintaining the pressure for 4 hours after adding materials; then keeping the temperature in the reaction kettle at about 100° C., and removing unreacted small molecules by vacuum, to obtain the phosphorus-containing diol intermediate;

3) heating the reaction kettle to 48° C.-52° C., firstly add all the TDI according to a molar ratio of phosphorus-containing diol intermediate: TDI=1:(3-4), and then adding all the phosphorus-containing diol intermediate at a constant speed;

4) heating the reaction kettle to 78° C.-82° C., and then reacting for 1.9 h-2.2 h;

5) removing unreacted excess TDI through a film evaporator; and 6) cooling the reaction kettle to 48° C.-52° C., then discharging and packaging to obtain a product with a P content of 4.4%, an N content of 7.9%, and an NCO % content of 11.9%.

According to the present invention, the polyether polyol and the modified isocyanate are combined in a weight ratio of 100:(100-160) to produce the structural flame retardant high strength low exothermic polymer grouting material, leading to internal reaction temperature ≤100° C., strength ≥60 mPa, bonding ≥3 mPa, oxygen index ≥28% while no halogen and no effect on water quality, odor level (80° C.) ≤3.5, and fog test ≤5 mg (which means no physical additive flame retardant is diffused into the environment). The following technical solutions are adopted synchronically to realize the above indicators:

1. The present invention adopts the polyether polyol which adopts the 6-functionality sorbitol as the initiator, which will produce sufficient cross-linking degree and rigidity when reacting with isocyanate, so that the polyurethane material has higher compressive strength and dimensional stability. Compared with the high-functionality polyether which adopts sucrose as the initiator and satisfies the 6-functionality, it also has the following two significant advantages: (1) the functionality of the sorbitol itself is 6, and the functionality of sorbitol polyether is about 6 and uniform, leading to large material cross-linking density; while the 6-functionality sucrose polyether is 67% 8-functionality sucrose and 33% 2-functionality water with ethylene glycol and diethylene glycol compound initiator; the 33% 2-functionality can only play the role of chain extension rather than cross-linking, leading to small cross-linking density of the material; (2) Compared with the high-functionality polyether which adopts sucrose as the initiator and satisfies the 6-functionality, the 6-functionality sorbitol polyether polyol has a lower viscosity, which is more than 30% lower on average; the lower viscosity is conducive to the mixing and transportation of raw materials; furthermore, the viscosity can be reduced by adding fewer or no plasticizers and flame retardants.

According to the present invention, 4,4'-bis-sec-butylaminodiphenylmethane is used in the combined polyether polyol component, whose equivalent (molecular weight/functionality) is 155. The smaller equivalent yields more urea group hard segments. Compared with that in carbamate (polyurethane), the hydrogen bonding force in the urea group is much stronger, and the interaction force of the to intermolecular (i.e. interchain) in the polyurea structure is much stronger. The phase separation of hard chains such as urea groups and polyisocyanurate groups and soft segments such as polyetheramine is more obvious. The melting temperature of the polymer hard segment region is also higher than that of the polyurethane structure, and the compressive strength is also higher.

The present invention does not add any physical flame retardant in the combined polyether polyol component, which can avoid the plasticizing effect of the physical flame retardant, thereby improving the compressive strength of the polyurethane material.

2. The modified isocyanate is used instead of the conventional polymerized MDI, wherein the P content of the modified isocyanate is 4.4%, and the phosphorus content of the material obtained by combining with the polyether polyol at the ratio of (100-160):100 is 2.2-2.64%, which is equivalent to the phosphorus content obtained by adding 61 parts of TCPP to 200 parts of raw materials or adding 76 parts of TCPP to 250 parts of raw materials. As a result, a good flame retardant effect is obtained while avoiding odor problems caused by adding physical halogen phosphate flame retardant into the system. No physical flame retardant or other plasticizer is added in the system, resulting in very low fog test values. The low fog test result means that no physical additive flame retardant in the thermal insulation material is diffused to the environment, and the flame retardancy of the material will not decrease with time in the future.

It is more important that not adding the physical flame retardants can improve the compressive strength of the material: on the one hand, the plasticizing effect caused by the additive physical flame retardant is avoided; on the other hand, there is no additive physical flame retardant to increase the material density (61 parts of TCPP are added to 200 parts of raw materials, which passively increases the material density by about 30%).

3. Compared with the conventionally polymeric MDI or modified polymeric MDI, the —NCO group of TDI is less active due to steric hindrance. Two ends of the modified isocyanate of the present invention are capped with TDI, and its molecular weight is large. As a result, the reactivity is relatively moderate, which avoids rapid rise of system temperature caused by severe exotherm, and keeps the system temperature ≤100° C. At the same time, the appropriate reactivity improves the bonding force.

4. The present invention adds long chain segments into the modified isocyanate, which greatly increases the toughness of the material and avoids the addition of halogen and non-halogen plasticizers such as chlorinated paraffin and TCPP as well as flame retardants. The present improves the compressive strength of the material while avoids the increase of odor and fog test value caused by adding halogen and non-halogen plasticizers and flame retardants to the system (the lower the fog test result, the fewer the physically flame retardant in the thermal insulation materials will diffuse to the environment). In particular, with no halogen in the plasticizers, there will be less combustion smoke, wherein the present invention will not release corrosive or irritating hydrogen halide gas, nor produce toxic carcinogens polybrominated benzoxins and polybrominated dibenzofurans, thereby avoiding the long-term impact of the material on the environment.

DETAILED DESCRIPTION OF THE PREFERRED EMBODIMENT

Technical solutions in experimental examples of the present invention will be clearly and completely described below. Obviously, the experimental examples described are only a part of all possible ones of the present invention. Based on the following experimental examples of the present invention, all other experimental examples obtained by those of ordinary skill in the art without creative work shall fall within the protection scope of the present invention.

Embodiment 1

The embodiment 1 provides a structural flame retardant high strength low exothermic polymer grouting material for consolidating, consisting of: a modified isocyanate component and a polyol component which are polymerized together, wherein a mass ratio of the modified isocyanate component to the polyol component is (100-160):100; a structural formula of the modified isocyanate component is:

the modified isocyanate component has a P content of 4.4%, an N content of 7.9%, and an NCO % content of 11.9%;

the polyol component comprises: polyether polyol which adopts 6-functionality sorbitol as an initiator, 4,4'-bis-sec-butylaminodiphenylmethane, silicone oil, and a reactive auxiliary agent, wherein the polyether polyol which adopts the 6-functionality sorbitol as the initiator accounts for 50-70% of a total weight of the polyol component; 4,4'-bis-sec-butylaminodiphenylmethane accounts for 25-45% of the total weight of the polyol component; the silicone oil accounts for 1-3% of the total weight of the polyol component; and the reactive auxiliary agent accounts for 2-4% of the total weight of the polyol component.

The polyether polyol which adopts the 6-functionality sorbitol as the initiator is a highly active polyether with the sorbitol as the initiator and propylene oxide as a polymerized monomer. The polyether polyol which adopts the 6-functionality sorbitol as the initiator adopts YD6482 from Hebei Yadong Chemical Group Co., Ltd. or NJ-6207 from Jurong Ningwu New Material Development Co., Ltd.

The 4,4'-bis-sec-butylaminodiphenylmethane is a liquid sec-diamine. Since the hydrogen atom on each amino group is replaced by a sec-butyl group, the combination of the active hydrogen atom and the sec-butyl group in the limited space generated many unique properties, and the amino moiety forms a urea bond that affects the hard segment. It is attached to the polymer, neither leaching nor precipitation, and the alkyl group increases the solubility of the diamine, making it mixable with almost any polyol and polyamine.

The auxiliary agent comprises a material surfactant and a reactive catalyst, the surfactant accounts for 1-3% of the total weight of the polyol, and the reactive catalyst accounts for 2-4% of the total weight of the polyol. The silicone oil is polydimethylsiloxane, which adopts L6950 from Momentive High-tech Materials Group. The reactive catalyst mainly adopts Dabco T from Evonik Specialty Chemicals (Shanghai) Co., Ltd.

The embodiment 1 also provides a method for synthesizing the structural flame retardant high strength low exothermic polymer grouting material for consolidating, comprising a step of polymerizing a modified isocyanate component with a polyol component, wherein a method for synthesizing the modified isocyanate component comprises steps of:

1) esterifying 2-carboxyethyl phenyl hypophosphorous acid and ethylene glycol with a molar ratio of 1:1, so as to obtain 2-carboxyethyl phenyl hypophosphite ethylene glycol, wherein a reaction equation is:

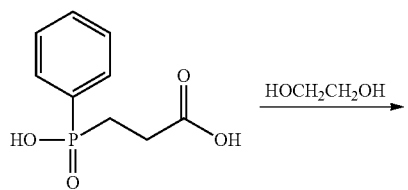

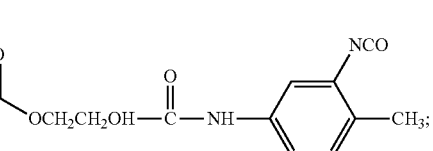

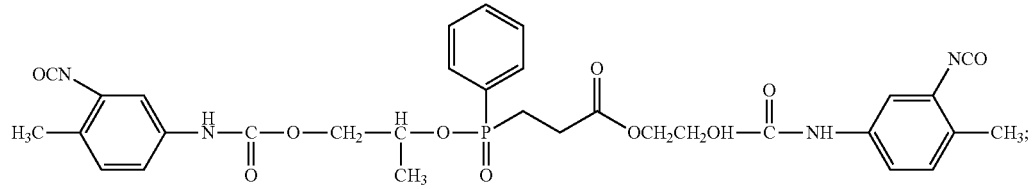

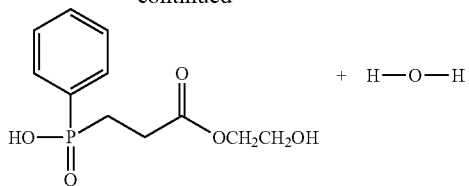

2) performing an addition reaction to the 2-carboxyethyl phenyl hypophosphite ethylene glycol and propylene oxide with a molar ratio of 1:1, so as to generate a phosphorus-containing diol intermediate, wherein a reaction equation is:

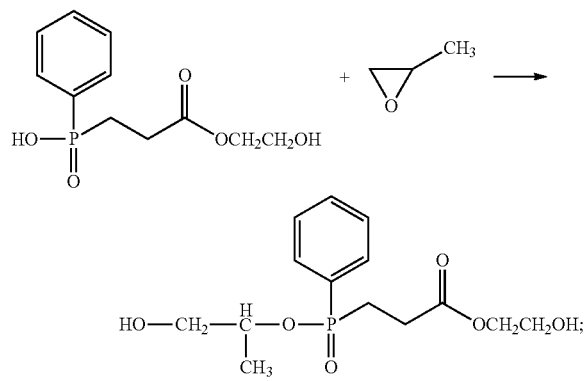

and 3) polymerizing the phosphorus-containing diol intermediate and TDI to obtain a difunctional modified flame retardant isocyanate compound, wherein a reaction equation is:

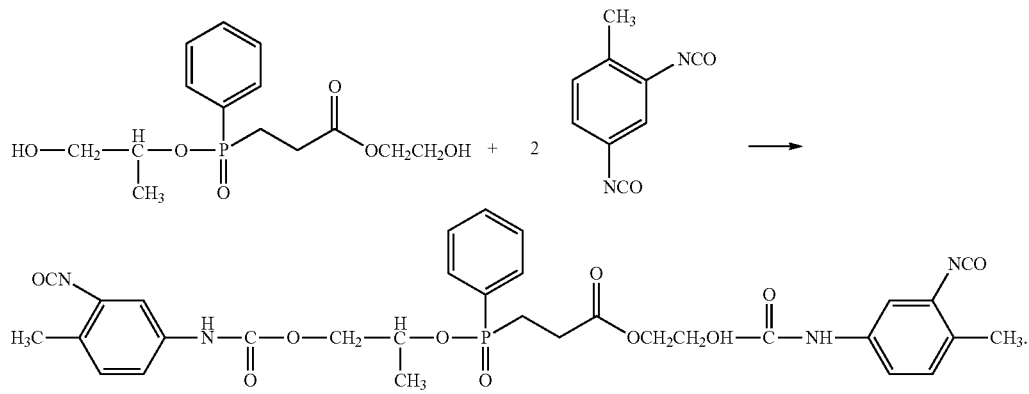

Specific synthesis process of the modified isocyanate comprises steps of:

1) putting 2-carboxyethylphenyl hypophosphorous acid (Wuhan Hezhong Biochemical Manufacturing Co., Ltd.) and ethylene glycol into a reaction kettle at a molar ratio of 1:1, and then esterifying at 105-110° C. under catalysis of sulfuric acid or organotin to generate the 2-carboxyethyl phenyl hypophosphite ethylene glycol, wherein resulting water is distilled off from a top of the reaction kettle;

2) heating the 2-carboxyethyl phenyl hypophosphite ethylene glycol to between 100-110° C. in reaction kettle, using potassium hydroxide a catalyst, and slowly adding propylene oxide at a molar ratio of 1:1; gradually raising a reaction pressure in the reaction kettle and keeping a maximum pressure below 2.5 kg; keeping a temperature in the reaction kettle between 100-115° C., and maintaining the pressure for 4 hours after adding materials; then keeping the temperature in the reaction kettle at about 100° C., and removing unreacted small molecules by vacuum, to obtain the phosphorus-containing diol intermediate;

3) heating the reaction kettle to 48° C.-52° C., firstly add all the TDI according to a molar ratio of phosphorus-containing diol intermediate: TDI=1:(3-4), and then adding all the phosphorus-containing diol intermediate at a constant speed;

4) heating the reaction kettle to 78° C.-82° C., and then reacting for 1.9 h-2.2 h;

5) removing unreacted excess TDI through a film evaporator; and 6) cooling the reaction kettle to 48° C.-52° C., then discharging and packaging to obtain a product with a P content of 4.4%, an N content of 7.9%, and an NCO % content of 11.9%.

Experimental Examples 1-4

According to the experimental examples 1-4, the combined polyether polyol formula is as follows:

| Name | Weight percentage |
|---|---|
| YD6482 (polyether polyol, Hebei Yadong Chemical Group Co., Ltd.) | 60 |
| 4,4'-bis-sec-butylaminodiphenylmethane (Wanhua Chemical Group Co., Ltd.) | 36 |
| L6950 (silicone oil, Momentive High-tech Materials Group) | 1 |

-continued

| Name | Weight percentage |
|---|---|
| Dabco T (catalyst, Evonik Specialty Chemicals (Shanghai) Co., Ltd.) | 2.5 |
| PC 46 (catalyst, Evonik Specialty Chemicals (Shanghai) Co., Ltd.) | 0.5 |
| Total | 100 |

100 parts of the above-mentioned combined polyether polyol were mixed and stirred with the total parts of the isocyanate component and the physical flame retardant component of each experimental example in the following table, to prepare the product.

The isocyanate components and additive flame retardant components of each experimental example are as follows:

| | Name | Experimental example 1 | Experimental example 2 | Experiment example 3 | Experimental example 4 |
|---|---|---|---|---|---|
| Isocyanate component | PM 200 (Wanhua Chemical Group Co., Ltd.) | 100 | 100 | 0 | 0 |
| | Modified isocyanate compound | 0 | 0 | 100 | 160 |
| Physical flame retardant component | TCPP (flame retardant, Zhejiang Wansheng Co., Ltd.) | 0 | 60 | 0 | 0 |
| Total parts of isocyanate component and physical flame retardant component | | 100 | 160 | 100 | 160 |

Performance of each experimental example is as follows:

| | Name | Experimental example 1 | Experimental example 2 | Experimental example 3 | Experimental example 4 |
|---|---|---|---|---|---|
| Flame retardancy | Phosphorus content in foam % | 0 | 2.17 | 2.20 | 2.71 |
| | Oxygen Index % | 18.5 | 27.9 | 28.4 | 30.2 |
| Environmental performance | Odor rating (80° C.) | 3.5 | 4.5 | 3.5 | 3.5 |
| | Fog test/mg | 4.45 | 51.84 | 4.62 | 4.13 |
| Physical properties | Specific gravity | 1.08 | 1.11 | 1.08 | 1.09 |
| | Compressive strength mPa | 56 | 41 | 61 | 67 |

Odor level test standard: VDA270:1992.

Fog test: Q/ZK JS 364-201903.

Compared with the experimental example 1, the experimental example 2 added 60 parts of physical flame retardant component TCPP while the other conditions were remained. The oxygen index increased from 18.5%, which was not flame retardant, to 27.9%, which was flame retardant. At the same time, the odor level (80° C.) increased from 3.5 to 4.5, the fog test increased from 4.45 mg to 51.84 mg, and the compressive strength decreased from 56 mPa to 41 mPa. It can be seen that the physical flame retardant component TCPP brought foam retardancy, but seriously affected the environmental protection performance and compressive strength of the material.

Compared with the experimental example 1, the experimental example 3 did not add the physical flame retardant TCPP. The oxygen index increased from 18.5%, which was not flame retardant, to 28.4%, which was flame retardant. At the same time, there was not much change in the odor levels (80° C.), which were 3.5 and 3.5 respectively, and there was also not much change in the compressive strengths, which were 56 mPa and 61 mPa respectively. It can be seen that the modified isocyanate can improve the flame retardancy of polyurethane foam without adding the flame retardants, so as to avoid reducing the environmental protection indexes by the flame retardants. The conflict of high flame retardancy and environmental protection indexes such as low odor was resolved.

Compared with the experimental example 2, the experimental example 3 kept basically the same P content in the foam while there was not much change in the oxygen index. However, since the experimental example 2 added 60 parts of the physical flame retardant component TCPP as the flame Retardant and the plasticizer, the odor level (80° C.) increased to 4.5, the fog test increased to 51.84 mg, and the compressive strength decreased to 41 mPa. It can be seen that compared with the physical flame retardant TCPP, the modified isocyanate has significant advantages in environmental protection and compressive strength.

Compared with the experimental example 2, the experimental example 4 kept the total parts below 260 while the oxygen index increased from 27.9% to 30.2%, the odor level (80° C.) decreased from 4.5 to 3.5, the fog test decreased from 51.84 to 4.13 mg, and the compressive strength increased from 41 mPa to 67 mPa. It further indicated that compared with the physical flame retardant TCPP, the modified isocyanate has significant advantages in environmental protection and compressive strength.

Experiment Examples 5-6

Compared with that of the experimental example 4, the combined polyether polyol formula in the experimental examples 5-6 is as follows:

| Name | Experimental example 4 | Experimental example 5 | Experimental example 6 |
|---|---|---|---|
| YD6482 (polyether polyol, Hebei Yadong Chemical Group Co., Ltd.) | 60 | 36 | 80 |
| 4,4'-bis-sec-butylaminodiphenylmethane (Wanhua Chemical Group Co., Ltd.) | 36 | 60 | 16 |
| L6950 (silicone oil, Momentive High-tech Materials Group) | 1 | 1 | 1 |
| Dabco T (catalyst, Evonik Specialty Chemicals (Shanghai) Co., Ltd.) | 2.5 | 2.5 | 2.5 |
| PC 46 (catalyst, Evonik Specialty Chemicals (Shanghai) Co., Ltd.) | 0.5 | 0.5 | 0.5 |
| Total | 100 | 100 | 100 |

100 parts of the above-mentioned combined polyether polyol were mixed and stirred with 150 parts of the 3-functionality modified isocyanate component, to prepare the foam product.

Flame retardancy and environmental performance of each experimental example are as follows:

| | Name | Experimental example 4 | Experimental example 5 | Experimental example 6 |
|---|---|---|---|---|
| Flame retardancy | Phosphorus content in foam % | 2.71 | 2.71 | 2.71 |
| | Oxygen Index % | 30.2 | 30.7 | 30.0 |
| Environmental performance | Odor rating (80° C.) | 3.5 | 3.5 | 3.5 |
| | Fog test/mg | 4.13 | 4.68 | 4.41 |
| Physical properties | Specific gravity | 1.09 | 1.13 | 1.07 |
| | Compressive strength mPa | 67 | 55 | 57 |

According to the experimental examples 5 and 6, the ratio of YD6482 to 4,4'-bis-sec-butylaminodiphenylmethane in the white material formula was changed from 5:3 to 3:5 and 5:1 respectively without changing the isocyanate component. As a result, the compressive strengths were 55 mPa and 57 mPa, respectively, which were obviously changed. The reason of this may be: when the ratio of YD6482:4,4'-bis-sec-butylaminodiphenylmethane is about 5:3, the foam strength reaches the maximum value. At this ratio, the hard segments in the foam are reticulated intersecting continuous phases, while the soft segments are transformed into dispersed phases and dispersed among the hard segments. The reasonable degree of microphase separation and hard segment domain size of the material leads to a high compressive strength. In the experimental example 6, the proportion of the 4,4'-bis-sec-butylaminodiphenylmethane was too small, so the soft segments were reticulated intersecting continuous phases, while the hard segments were transformed into a dispersed phase and dispersed among the soft segments, leading to poor compressive strength of the foam. In the experimental example 5, the proportion of the 4,4'-bis-sec-butylaminodiphenylmethane was too large, so the average functionality of the combined polyether polyol was low, while the foam cross-linking density was insufficient, leading to poor compressive strength of the foam.

Last but not least, it should be noted that the above are only preferred embodiments of the present invention, and are not intended to be limiting. Although the present invention has been described in detail with reference to the experimental examples, the technical solutions described can be modified or equivalently replaced in part. The present invention is described in detail above, but is not limit thereto. Those skilled in the art should understand that various modifications or deformations made on the basis of the technical solutions of the present invention without creative work are still within the protection scope of the present invention.

What is claimed is:

1. A structural flame retardant high strength low exothermic polymer grouting material for consolidating, consisting of: a modified isocyanate component and a polyol component which are polymerized together, wherein a mass ratio of the modified isocyanate component to the polyol component is (100-160):100; a structural formula of the modified isocyanate component is:

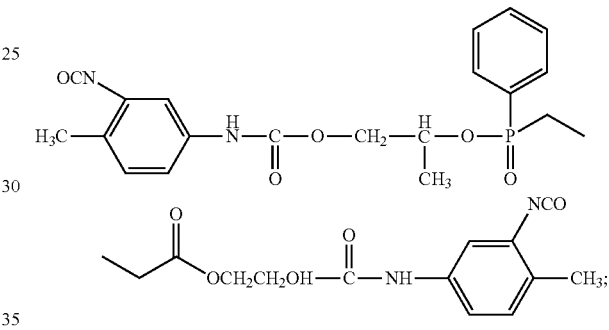

the polyol component comprises: polyether polyol which adopts 6-functionality sorbitol as an initiator, 4,4'-bis-sec-butylaminodiphenylmethane, silicone oil, and a reactive catalyst, wherein the polyether polyol which adopts the 6-functionality sorbitol as the initiator accounts for 50-70% of a total weight of the polyol component; 4,4'-bis-sec-butylaminodiphenylmethane accounts for 25-45% of the total weight of the polyol component; the silicone oil accounts for 1-3% of the total weight of the polyol component; and the reactive catalyst accounts for 2-4% of the total weight of the polyol component.

2. The structural flame retardant high strength low exothermic polymer grouting material for consolidating, as recited in claim 1, wherein the modified isocyanate component has a P content of 4.4%, an N content of 7.9%, and an NCO % content of 11.9%.

3. The structural flame retardant high strength low exothermic polymer grouting material for consolidating, as recited in claim 1, wherein the polyether polyol which adopts the 6-functionality sorbitol as the initiator is a highly active polyether with the sorbitol as the initiator and propylene oxide as a polymerized monomer.

4. The structural flame retardant high strength low exothermic polymer grouting material for consolidating, as recited in claim 3, wherein the silicone oil is polydimethylsiloxane.

5. A method for synthesizing the structural flame retardant high strength low exothermic polymer grouting material for consolidating as recited in claim 1, comprising a step of polymerizing a modified isocyanate component with a polyol component, wherein a method for synthesizing the modified isocyanate component comprises steps of:

1) esterifying 2-carboxyethyl phenyl hypophosphorous acid and ethylene glycol with a molar ratio of 1:1, so as to obtain 2-carboxyethyl phenyl hypophosphite ethylene glycol, wherein a reaction equation is:

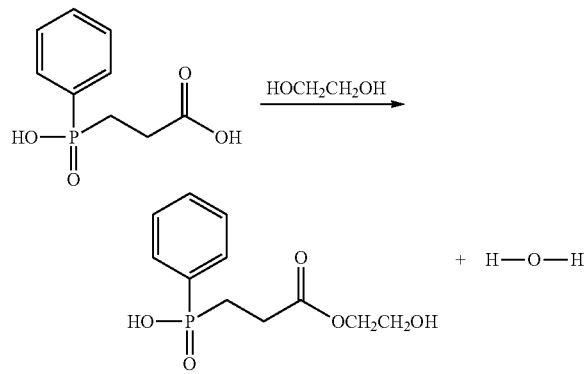

2) performing an addition reaction to the 2-carboxyethyl phenyl hypophosphite ethylene glycol and propylene oxide with a molar ratio of 1:1, so as to generate a phosphorus-containing diol intermediate, wherein a reaction equation is:

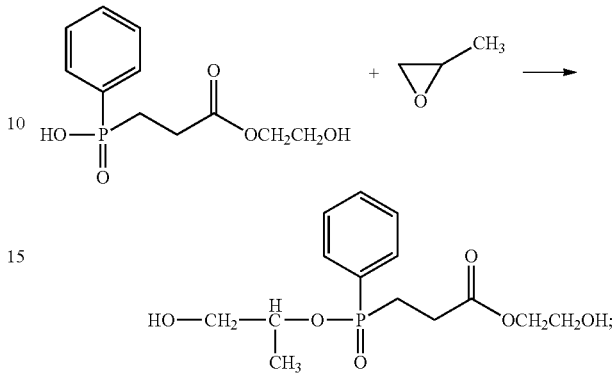

and 3) polymerizing the phosphorus-containing diol intermediate and toluene diisocyanate to obtain a difunctional modified flame retardant isocyanate compound, wherein a reaction equation is:

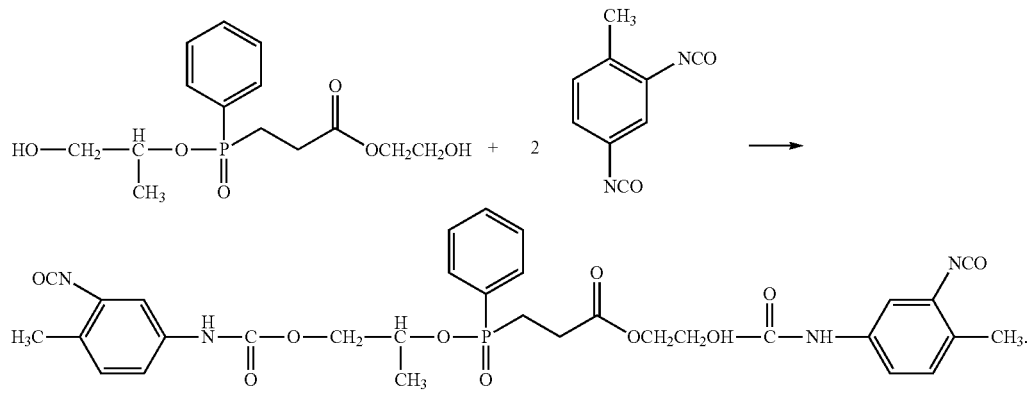

* * * * *